(12) United States Patent
Benedetti et al.

(10) Patent No.: US 7,954,539 B2
(45) Date of Patent: Jun. 7, 2011

(54) PROCESS AND A PLANT FOR THE PRODUCTION OF METAL STRIP

(75) Inventors: Gianpietro Benedetti, Tricesimo (IT); Alfredo Poloni, Fogliano Redipuglia (IT); Nuredin Kapaj, Udine (IT)

(73) Assignee: Danieli & C.Officine Meccanicite, S.p.A., Buttrio (IT)

( * ) Notice: Subject to any disclaimer, the term of this patent is extended or adjusted under 35 U.S.C. 154(b) by 5 days.

(21) Appl. No.: 12/450,290

(22) PCT Filed: Mar. 20, 2008

(86) PCT No.: PCT/EP2008/053353
§ 371 (c)(1), (2), (4) Date: Jan. 12, 2010

(87) PCT Pub. No.: WO2008/113848
PCT Pub. Date: Sep. 25, 2008

(65) Prior Publication Data
US 2010/0116456 A1    May 13, 2010

(30) Foreign Application Priority Data
Mar. 21, 2007 (IT) .............................. RM2007A0150

(51) Int. Cl.
*B22D 11/12*  (2006.01)
*B22D 11/14*  (2006.01)
*B22D 11/20*  (2006.01)
*B21B 1/46*   (2006.01)

(52) U.S. Cl. ........ 164/476; 164/477; 164/417; 164/454; 29/527.7

(58) Field of Classification Search .................. 164/417, 164/454, 476, 477; 29/527.7
See application file for complete search history.

(56) References Cited

U.S. PATENT DOCUMENTS
4,953,615 A   9/1990   Hulek
5,479,982 A   1/1996   Hoffken et al.
5,634,257 A   6/1997   Kajiwara et al.
(Continued)

FOREIGN PATENT DOCUMENTS
DE         10310357        9/2004

*Primary Examiner* — Kevin P Kerns
(74) *Attorney, Agent, or Firm* — Stetina Brunda Garred & Brucker

(57) ABSTRACT

A process and an ultracompact plant for the endless production of hot rolled steel strip comprising an ingot mold (15) that produces a very thin slab, having narrow sides with thickness in the range between 40 and 55 mm and a central swelling, at a speed in the range between 4 and 16 m/min. Such a slab, which displays a core in which the steel is still liquid, is passed through a vertical pre-rolling device (16) that reduces the thickness of the slab and flattens it. The solidified slab may thus be subjected to a first mild rolling by a conveyor (17) and, by forming a free curve, takes a horizontal position where it is subjected to a first surface descaling, a first rolling, a heating in an inductor (23), a second surface descaling and a series of reductions in a rolling mill (30) formed by at least two stands, by maintaining its temperature along the mill above the recrystallization point Ar3. Downstream of the rolling mill (30) there are provided a roller runway with cooling showers, a flying shear (33) for cutting to length the strip produced, pinch rolls and at least two spinning wheels (34) for the formation of coils of the hot rolled strip.

15 Claims, 3 Drawing Sheets

U.S. PATENT DOCUMENTS

| | | | |
|---|---|---|---|
| 5,720,335 A * | 2/1998 | Osada et al. | 164/475 |
| 5,832,985 A | 11/1998 | Pleschiutschnigg | |
| 6,092,586 A * | 7/2000 | Schonbeck | 164/476 |
| 6,832,432 B2 * | 12/2004 | Bald et al. | 29/527.7 |
| 6,978,531 B1 * | 12/2005 | Che et al. | 29/527.7 |
| 7,117,925 B2 * | 10/2006 | Strezov et al. | 164/476 |
| 7,181,822 B2 * | 2/2007 | Ondrovic et al. | 29/527.7 |
| 7,343,961 B2 * | 3/2008 | Arvedi | 164/452 |
| 2005/0167076 A1 | 8/2005 | Hennig et al. | |

\* cited by examiner

PROCESS AND A PLANT FOR THE PRODUCTION OF METAL STRIP

FIELD OF THE INVENTION

The present invention relates to a process and a related plant for the endless production of a hot rolled steel strip from thin slabs cast at a high rate.

STATE OF THE ART

There are known in the state of the art processes and plants for the production of hot rolled steel strip starting from a classical slab, having a thickness from 150 up to 320 mm, or from a normal thin slab having a thickness of about 60-90 mm.

Such plants comprise at least one ingot mould lowerly associated to a curved roller path, or roller conveyor, adapted to contain and guide the cast slab in the passage from the vertical casting direction to the horizontal rolling direction. Normally, the metallurgic cone, that is the substantially conical central area of the slab in which the steel still remains liquid, extends outside the ingot mould and closes along the curved path, so that the completion of the solidification occurs in the roller runway.

The rollers at the metallurgic cone also exert a pressure on the solidified skin to perform a pre-rolling of the liquid core slab in order to obtain a thinner thickness at the end of the casting machine. Furthermore, secondary cooling systems for cooling the slab consisting, for example, of a plurality of spraying nozzles are associated to the roller conveyor.

Downstream the casting machine, and in line therewith, there are normally provided a shear for cutting to length the product, a long tunnel oven for the recovery of the temperature of the single slabs so that they are suitable for rolling, a descaler and a rolling mill, formed by six or more stands, which reduces the thickness of the slabs until the desired value for the strip is obtained. As the passage through each stand and the related reduction in thickness imply a lowering of the strip temperature, in order to maintain the temperature of the material above the recrystallisation point $Ar_3$, and therefore to always roll in the austenitic field, the plants of the known art also comprise interstand inductors to appropriately heat the strip during rolling.

Downstream the rolling mill there are finally provided strip cooling systems, a shear for cutting to length and winding devices for the strip in coils having a predefined weight.

A first problem occurring in production lines made in this manner is related to the extensive overall length of the line, that not only affects the investment costs, but also the production energy costs and the maintenance costs.

Another problem with the known plants concerns the discontinuity of the production process which implies a interruption of feeding to the rolling mill and the impossibility to roll without interruption, that is in the so-called "endless" mode, with subsequent negative repercussions on the energy consumptions and on the environmental impact.

The need is therefore felt to make a plant and a related production process for a hot rolled strip, which are adapted to operate without interruption allowing to implement a highly compact configuration of the production line and a considerable reduction of the production costs per ton.

Great efforts have been made in this direction and several non "endless" solutions have been suggested, but in any case the space occupied and the number of rolling stands required for the reduction of the thickness to the desired values remain high.

Furthermore, the need is felt to provide a process that allows the manufacture of a hot rolled strip having a thin thickness and a high commercial quality such as to allow to replace the cold rolled products for many applications.

SUMMARY OF THE INVENTION

It is the primary object of the present invention to provide an ultracompact plant and a related endless process for the production of hot rolled steel strip starting from thin slabs obtained by continuous casting at high rates.

It is another object of the present invention to obtain a hot rolled strip having a thickness variable in the range from 0.8 to 12 mm, having an inner structure with fine grains which are so uniformly distributed as to already display the typical features of a cold rolled material and thus have a high quality and no defects.

It is a further object of the invention to provide a plant capable to directly produce in endless mode hot rolled coils from liquid steel, with a productivity in the range between 500.000 and 1.500.000 tons/year which reduces investment and running costs if compared to a traditional plant to produce the same thicknesses of strip.

Therefore, the present invention proposes to solve the problems set forth above and achieve the above said objects by performing a process for the endless production of hot rolled metal strip which, according to claim 1, comprises an ingot mould including a crystalliser, a soft reduction device, placed near the outlet section of the crystalliser, a first pinch roll, a path deviation and guide device operable at least during predetermined periods of time, a first descaler including a second pinch roll, a first rolling stand, heating and/or temperature holding means, a second descaler including a third pinch roll, and a rolling finishing mill consisting of at least two second rolling stands, the process comprising the following steps without intermediate interruptions:

a) casting a thin slab exiting from the crystalliser at a rate comprised in a range between 4 and 16 m/min, having narrow sides with a size in a range between 40 and 55 mm, and a core in which the steel is in a liquid state, b) carrying out a soft reduction operation of the slab by means of said pre-rolling device, so as to obtain a completely solidified cast product having a thickness in a range between 15 and 37 mm, c) forming a free curve on the cast product comprised in a portion between said first pinch roll and said second pinch roll, d) carrying out a first descaling operation on the cast product by means of said first descaler, e) carrying out a first rolling operation in the first rolling stand defining reductions up to 40-50% in the thickness of the completely solidified cast product;

f) heating and/or temperature holding operation by means of said heating and/or temperature holding means, g) carrying out a second descaling operation on the cast product by means of said second descaler, h) carrying out a plurality of second rolling operations in said rolling finishing mill, for defining a strip having a thickness in the range between 0.8 and 12 mm.

Such a process is carried out, according to another aspect of the present invention, by means of a plant for the endless production of hot rolled metal strip which, according to claim 14, comprises an ingot mould including a crystalliser adapted to produce a liquid core thin slab having a thickness in the range between 40 and 55 mm, a liquid core pre-rolling device, placed near the outlet section of the crystalliser, a first pinch roll, a first descaler including a second pinch roll, a first rolling stand, heating and/or temperature holding means, a second descaler including a third pinch roll and a rolling finishing mill formed by at least two second rolling stands, wherein between the first pinch roll and the second pinch roll there is provided a deviation and guide device, operable at least during predetermined periods of time, for deviating and guiding the cast product from a vertical path to a horizontal path, adapted to release the product cast at a regular running condition so as to allow the formation of a free curve of the cast product in a portion between said first and second pinch roll.

The features of the process and of the plant according to the present invention are listed hereafter highlighting the advantages thereof.

In the tundish, heating systems may be advantageously used for heating the liquid steel, the heating systems being suitable to ensure an efficient and reliable control of the overtemperature of the steel in the tundish with respect to its "liquidus" temperature, said overtemperature also being known as "superheat", during the casting. Preferably, a plasma torch may be used to correct the superheat values of the liquid steel and specifically to recover possible temperature falls in the tundish, especially at the beginning of the casting when the absorption of the heat by the tundish is more intense, so as to ensure the absence of solidification thereof. With respect to other known heating devices, the use of the plasma torch does not create fluid dynamics disturbance problems in the tundish, it allows the fluctuation of the inclusions and guarantees a uniform distribution of the temperature of the liquid steel. Advantageously, a relatively low and uniform superheat is maintained, promoting a better metallurgical quality of the final product, on an average value of about 20° C. A constant superheat allows indeed to obtain an equi-axic structure and to ensure the uniformity of the features on all of the cast product.

The ingot mould employed allows to cast a slab through the crystalliser at a high rate, between 4 and 16 m/min, the slab having a much lower thickness than that obtained with the known ingot moulds, in the range between 40 and 55 mm, and in which the core also remains liquid next to the side end areas; advantageously, the tank or casting chamber of the crystalliser is such as to guarantee an appropriate space so that the liquid steel jets from the nozzle do not cause the undesired phenomenon of recasting of the skin formed around its internal surface, especially starting from a certain distance from the nozzle where the surface of the section of the jet is larger. Casting a very thin thickness at a high rate requires a higher cooling rate in the ingot mould: such a faster cooling advantageously allows to obtain a finer microstructure of the product.

The nozzle is preferably of the multi-port type and has a shape corresponding to the tank of the crystalliser such as to avoid solidification bridges. Advantageously the flow of the nozzle is adjusted so as to allow an appropriate fusion of the lubrication powders at the meniscus level and an adequate diffusion towards the side areas, by controlling in function of the casting rate the parts of flow giving rise to the liquid steel input towards the meniscus and towards the side areas of the crystalliser, for instance, by means of the use of electromagnetic devices.

In virtue of the presence of a metal core which is still in a molten state when exiting the ingot mould, all of the slab may be subjected to the liquid core pre-rolling, also designated as "soft-reduction", thus obtaining a refining of the structure of the solidifying core, with the reduction of the inner porosity and with the elimination of the central segregation. Advantageously, the liquid core pre-rolling is performed dynamically and in a controlled manner so as to correctly set the closing point of the liquid cone during the transients correlated to the variations which may intervene in the casting parameters with respect to the regular running conditions. In this manner an excellent quality of the slab is guaranteed in every operating condition The vertex of the liquid cone, that is the so-called "kissing point" where the two half-skins join, is at a short distance below the ingot mould; there follows that the roller conveyor performing the "soft-reduction" is relatively short with a subsequent saving of space.

A first pinch roll which may also advantageously carry out a first reduction of the thickness on the solidified product, designated here as "hard reduction" to distinguish it from the liquid core pre-rolling or soft-reduction, is placed just outside the "soft-reduction" segment; such a reduction in the thickness is relatively small and requires low pressing forces as it is carried out on the product when it is still very hot. Such a first mild rolling provides a further contribution to the quality, especially the internal quality, of the product as it closes the interdendritic regions between grains by means of a compaction of the structure. Furthermore, it allows to obtain an advantageous dynamical recrystallisation of the material which avoids the precipitation of the aluminium compounds around the grain and allows to achieve a more uniform structure; such a recrystallisation further allows not to have the formation of superficial cracks and irregular edges during the following rolling.

After the "hard reduction", the cast product has already reached a size and a thickness near to that of a strip, therefore it is also designated as "pre-strip" and, following a substantially curved path, it passes from the vertical casting direction to the horizontal rolling direction, without being guided by any device in the regular running conditions. As the pre-strip is still at a high temperature such as to provide the material with good ductility features, it has the possibility to lift and lower by a certain extent along the curved path. Such a free curve thus allows to create a decoupling between upstream and downstream of the same curve and therefore disengage to a certain extent the casting process from the rolling process allowing to provide flexibility to a plant which by itself would be rigid as it is "endless". Such a flexibility therefore allows to obtain the advantages of a "semi-endless" plant, such as for instance the use of less sophisticated and less complicated apparatuses for the control of the process, as the control of the drawing along the production line is not required. Such a curve substantially has the shape of a circumference arc during the regular operation of the plant.

In order to control the starting step of the casting process, which is a transient step during which the slab maintains the same thickness exiting from the ingot mould along all of the production line, there is provided a deviation and guide device for the cast product along the curved path which advantageously comprises a curved roller conveyor pivotably hinged around an end thereof. At the end of the starting step, the production process reaches a regular running rate, so that said roller conveyor is released so as to disengage and free the cast product and therefore allow its free flotation along the curved path.

A further advantage of the transient deviation and guide device in the form of a curved roller conveyor is to allow to intervene more conveniently to free the casting line in case of a cobble in the rolling mill or a malfunctioning of the casting machine, as for instance breakout or sticking in the ingot mould.

Indeed, while a conventional retaining and guiding roller conveyor for the slab is fixed, has a complex structure (rigid plant) and it implies long and complicated operations for the clearing of the line, with the roller conveyor according to the invention the casting line may instead be rapidly cleared and the production can start again without lengthy time losses and further arrangements. Indeed, in case a cobble occurs on the rolling mill or a breakout or a sticking in the ingot mould takes place, the inflow of liquid steel is stopped upstream and the slab is completely and rapidly evacuated from the vertical casting line by cutting it in only one piece or several pieces, by means of appropriate cutting means, such as for instance one or more oxygen cutting devices, said pieces being capable of freely falling in a collection case arranged under the vertical of the ingot mould.

Advantageously, said oxygen cutting devices carry out, in a direction transversal to the casting direction, one or more strokes at least equivalent to the width of the slab to be cut, while it slowly moves forward, and are preferably controlled by special robots completely automated; furthermore, the collection case is wheeled in order to allow the displacement thereof and is moved for instance by means of metal cables or other known methods.

At the beginning of the horizontal segment of the rolling line a descaler is provided for the removal of the scale from the surface of the cast product the descaler using very high pressure and very low flow rate water. Said descaler, which includes upstream a two roller pinch roll, is advantageously a high performance device, that is it allows to perform an accurate removal of the scale by employing the minimum water flow rate with a small temperature decrease of the cast product. Furthermore, the size of this device is very limited as far as depth is concerned.

After the descaler there are provided a device for the control of the temperature and of the geometrical shape of the cast product and a four-high rolling stand adapted to perform thickness reductions on said product. Advantageously, the setting of the rolling parameters of the stand is performed depending on what has been detected by said device in the sense that said rolling parameters are such as to create a profile for the strip which is suitable for the following rolling in the finishing mill placed further downstream, ensuring that a high quality product is obtained. Such a stand may carry out reductions in the thickness up to 40-50%.

Downstream said rolling stand there is provided a rotating blade drum shear which is mainly used at the beginning of the casting process and to cut long pieces of slab until the maximum casting rate is reached and, therefore, until the regular running of the plant; it is further used for all emergency situations, such as for instance a breakout or a sticking in the ingot mould or a cobble in the rolling mill, and may be employed to separate the head of the dummy bar when provided.

Downstream of the drum shear there are advantageously provided heating and/or temperature holding systems to ensure the correct temperature of the product inflowing in the first rolling stand of the finishing mill in any plant running condition. Such systems may be active, as for instance induction heating ovens or simply inductors, or passive, such as for instance insulated hoods or insulating panels.

As the thermal losses of the product along the casting path are very reduced with respect to the conventional plants, because of what has been set forth above, the dimensioning of said systems results in a limited size, that is a length in the range between 1 and 2 m. Advantageously, upon exit from one of said systems the product must have a temperature—homogeneous throughout the whole section thereof—of at least 1000° C., that is such as to ensure a temperature of at least 850° C. upon exit from the rolling mill.

In case of an induction heating system or simply an inductor, in order to ensure this value of temperature a power of, for instance, between 3 and 5 MW at 3000 Hz is required. Using the inductor or not using it as well as the precise power employed are determined by the casting conditions, specifically by the casting rate and by the thickness after the "soft-reduction": such parameters define the so-called "mass flow" and the temperature at the end of the rolling mill is correlated to said "mass flow". The inductor may appropriately heat only the edges, if necessary, or it may totally heat the entire pre-strip. It is on or off depending on the need and has a more limited power with respect to the known ones, used in similar plants, as the cast product to be heated has a thinner thickness. The inductor may advantageously be wheeled to be shut down laterally with respect to the production line. In this latter hypothesis, it allows a convenient access to the drum shear to carry out, for instance, the replacement of the blades.

Downstream of the heating systems there are provided systems for the removal of the superficial scale from the surface of the product, such as for instance a descaler. The descaler is advantageously wheeled for the lateral shutdown, thus allowing a more convenient maintenance thereof and a better accessibility to the first rolling stand of the finishing mill. The descaler uses very high pressure and very low flow rate water in order to reduce to minimum the surface cooling, totally ensuring that the entire superficial scale of the cast product is removed before the inflow in the mill.

The rolling finishing mill consists of at least two four high rolling stands each of which may carry out thickness reductions up to 70%. According to the process of the invention interstand inductors are not required to maintain the correct austenitic rolling temperature, with a subsequent reduction in size and costs.

Downstream of the rolling finishing mill, the following devices are provided: a roller runway with cooling showers, a flying shear for the cutting to length, conveyors and at least two spinning wheels, for instance of the "downcoiler" type. The flying shear for the cutting to length is used, when the plant is running regularly, to cut the strip to a length suitable to obtain the desired weight of the coil.

Downstream of the spinning wheels a terminal area is arranged for the storing of the long pieces of slab cut by the drum shear. By this solution the need for a dedicated scrap collection case, placed near the drum shear, is eliminated and thus a simplification of the foundations and a more reasonable layout is provided.

For the start of the casting process, the introduction of the head of the dummy bar within the end segment of the crystalliser may be carried out according to two modes.

The first mode implies to pass the dummy bar along the entire line from the end area downstream of the downcoilers where it is positioned; in such a mode the dummy bar passes through the entire rolling mill, which is stationary with the open stands, and by means of the curved roller conveyor it changes its direction from horizontal to vertical to then be introduced within the crystalliser. The casting having been started, the head of the dummy bar is separated from the slab by means of the drum shear.

The second mode implies instead to carry out the introduction of the dummy bar directly from below on the vertical direction of the ingot mould.

The entire production process described up to now, from the liquid steel in the tundish until the strip is obtained, is advantageously monitored by appropriate area controllers which run different components of the plant by also interacting therebetween; such area controllers abuts a supervisor which intervenes on the different variables involved, leading them to interact in an orderly manner to stabilise the process both with respect to the variations in the stationary conditions and with respect to disturbances and abnormalities which affect the plant. In this manner, the process is globally controlled in a robust, intelligent and dynamic manner so as to consider it a "smart full dynamic process".

The high rate of the cast product in the form of a thin slab and the direct connection with the rolling mill, which transform it into a strip starting from a thinner thickness than that of known casting processes and with a lower number of stands, as well as the overall reduced development of the production line, allow to have a lower impact on civil constructions, such as foundations, height of the warehouses, pipings, infrastructures, etc. This advantageously implies lower first investment and running costs and less maintenance with respect to a plant of the known art.

Furthermore, casting a very thin slab and carrying out a reduction of the thickness at first with a liquid core —"soft-reduction"—and then possibly with a solidified core —"hard-reduction"—allows to obtain a cast product/pre-strip thin enough with which to form a curve free to flotate; said free curve provides the considerable advantage of disengaging the casting and rolling processes thus making the plant more flexible.

BRIEF DESCRIPTION OF THE DRAWINGS

Further features and advantages of the invention will become more apparent in view of the detailed description of a preferred though not exclusive embodiment of a production plant for the metal strip shown by way of non limitative example, with the aid of the accompanying drawings in which.

DETAILED DESCRIPTION OF PREFERRED EMBODIMENTS OF THE INVENTION

Figure 1:
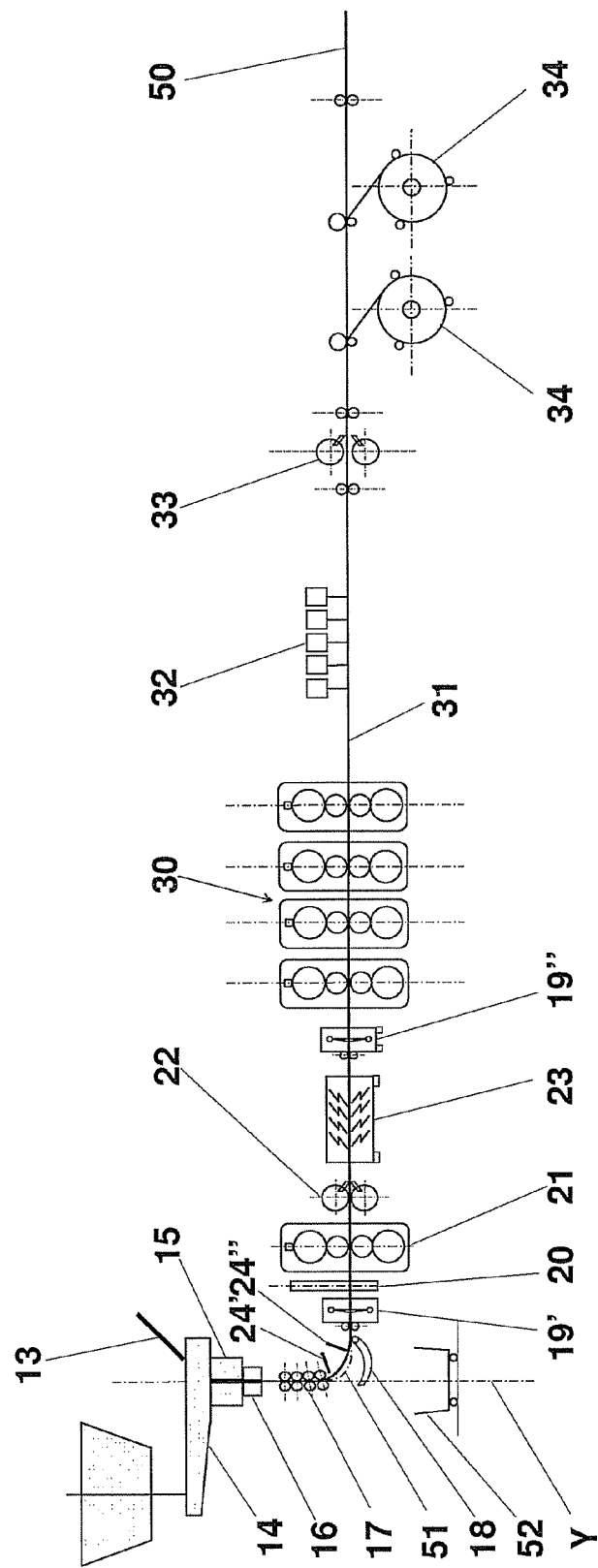
FIG. 1 represents a diagrammatic side view of a plant according to the invention.
Figure 2:
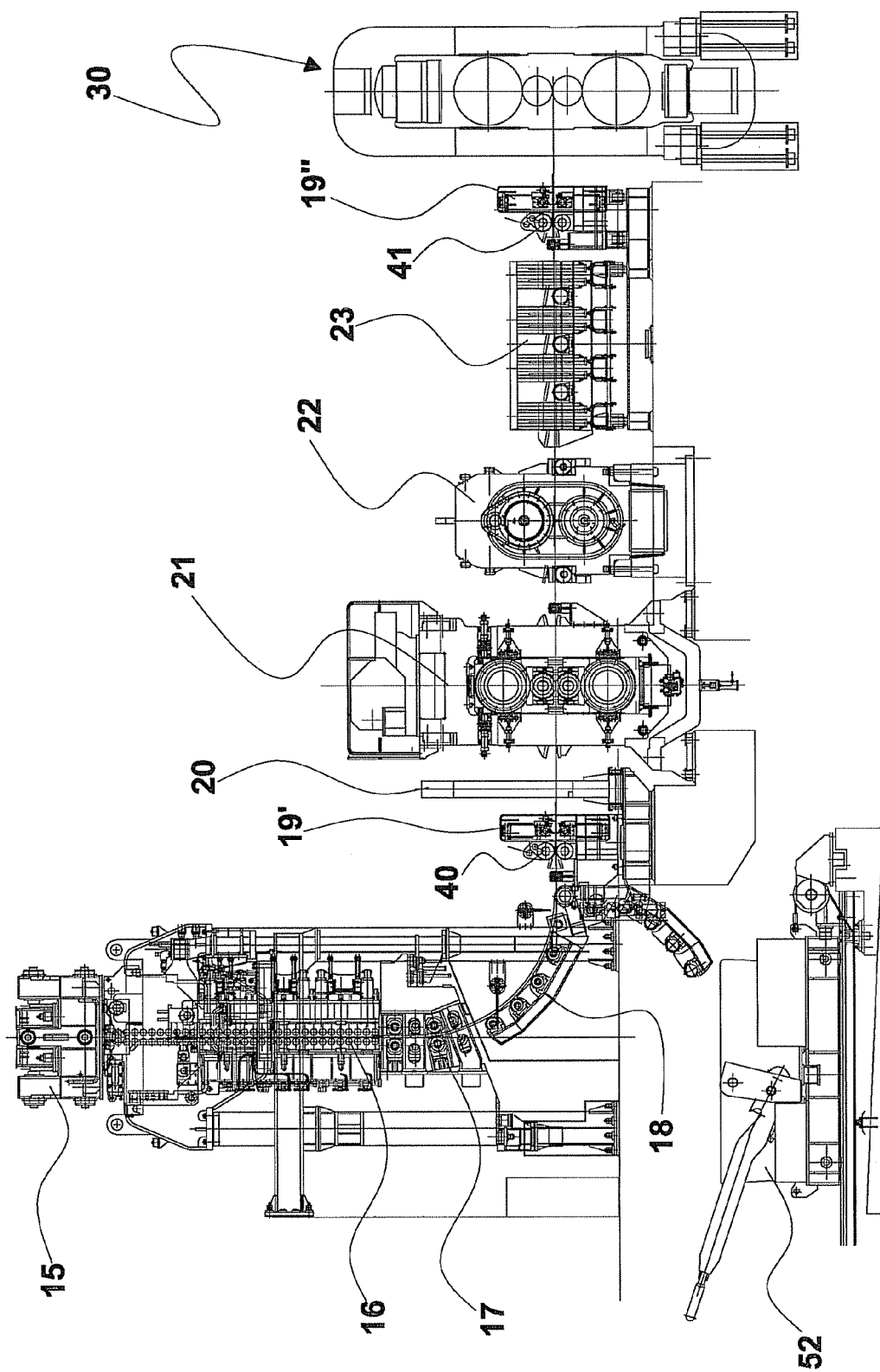
FIG. 2 represents a longitudinal section of an embodiment of part of the plant in FIG. 1.

With reference to the FIGS. 1 and 2 a plant for the production of metal strips is shown, comprising:
- an ingot mould 15 which includes a crystalliser for the production of thin slabs with a liquid core,
- a liquid core pre-rolling device, or "soft reduction" device 16, placed near the outlet section of the ingot mould and producing a completely solidified cast product,
- a first pinch roll 17 of the cast product, adapted to convey the cast product and which may also carry out a slight reduction of the thickness;
- cutting means 24', 24", such as for instance one or more oxygen cutting devices, to carry out the cutting of the slab in case of emergency, such as for instance a cobble in the rolling mill or a breakout or a sticking in the casting line; the oxygen cutting devices are completely automated and, being controlled by appropriate robots, carry out the cutting of the slab in a direction transversal to the casting direction while the same is moved forward to clear the casting line;
- a deviation and guide device 18 for temporarily deviating and guiding the non pre-rolled liquid core slab, that is the "non softed" slab, from a vertical path to a horizontal path,
- a wheeled case 52 placed under the vertical of the casting line,
- a first descaler 19',
- a control device 20 for controlling the temperature and the geometrical shape of the cast product,
- a four high rolling stand 21 which carries out a reduction in the thickness up to 40-50%,
- a drum shear 22,
- a heating system 23 for the pre-strip or the cast product, and/or a temperature holding system,
- a second descaler 19",
- a rolling stand mill 30, with at least two stands, in which each stand may carry out reductions of the thickness up to 70%,
- a series of cooling showers 32 for the strip arranged on a roller runway 31 for moving the strip forward,
- a flying shear 33 for the cutting to length,
- at least two spinning wheels 34,
- a storage area 50 for the cut slab pieces and, possibly, for the dummy bar.

The ingot mould 15 advantageously produces a very thin slab, having narrow sides of thickness in the range between 40 and 55 mm and a central swelling and a core in which the steel is still liquid, at a rate in the range between 4 and 16 m/min. In the following, when the thickness of the cast slab is mentioned, the thickness related to the end sides, designated as "narrow sides", is always considered.

Advantageously, in the tundish 14, upstream of the ingot mould, heating systems are used for heating the liquid steel which are suitable to ensure an efficient and reliable control of the "superheat" in the tundish during the casting. Preferably said heating systems comprise a plasma torch 13 for the correction of the "superheat" value of the liquid steel which is maintained relatively low, in favour of a better quality of the final product, on an average value around 20° C.

Near the outlet section of the ingot mould 15 there is provided a pre-rolling device 16, with a substantially vertical rolling axis, comprising a group of transversal intrados and extrados rollers profiled so as to modify the transit section of the slab and therefore carry out a progressive flattening action of the convex or swelled surface, as exiting from the crystalliser, so as to bring the slab to a cast product having a rectangular section. Such a convexity recovering action implies a compression of the liquid core slab until the thickness equivalent to the width of the narrow sides of the outlet section of the crystalliser is reached.

Advantageously, said transversal rollers may be placed at a shorter distance so as to obtain, exiting from the roller conveyor, a cast product having a smaller thickness with respect to that coming out from the crystalliser, other than linearised: substantially a reduction of the thickness on a slab still having a liquid core is carried out, that is the so-called "soft-reduction" is performed. According to the invention, at the end of the "soft-reduction" the slab is reduced to a thickness in the range between 15 and 37 mm.

The transversal intrados and extrados rollers are subdivided in two or more elements, also designated as "soft-reduction" segments, each having an independent adjustment control, for instance with hydraulic cylinders.

The group of transversal rollers, cooperating with an integrated cooling system, in any case also performs a retaining and guiding function for the slab still having the liquid core.

Advantageously, there are provided rapid exchange devices for the ingot mould 15 and for the sectors of the pre-rolling device or "soft-reduction" device 16.

Immediately downstream of the group of transversal rollers there is arranged a first pinch roll 17 consisting of a plurality of roller or cylinder pairs, preferably in number of four, arranged in series and forming a substantially vertical-curved path; each pair of rollers may perform a slight pressing on the completely solidified cast slab with a reduction of the thickness in the range between 0.1 and 0.7 mm. In this manner an actual rolling is carried out, which is also designated "hard reduction".

According to the present invention, at the end of the "hard-reduction" the cast product exits with a thickness in the range between 12 and 36 mm thus defining a product, designated as "pre-strip", which is very near to the final thickness of the strip to be produced. Such a rolling provides a further contribution to the quality, especially the internal quality, of the product as it closes the interdendritic regions between grains by means of a compaction of the structure.

In order to also be able to control the starting step of the casting process, which is a transient step, there is provided a deviation and guide device 18 which comprises a curved roller conveyor which may be selectively operated by a hydraulic cylinder (not shown) that brings it from a working position, in which it cooperates with the last rollers of the pinch roll 17 to join the curve with the horizontal rolling direction, to a released position in which it is lowered, and vice versa.

The curved roller conveyor 18 is also required to allow the introduction and the guiding of the head of the dummy bar within the crystalliser. When the casting starts the slab conveyed by the dummy bar is not provided with a liquid core, thus it is not possible to reduce the thickness thereof by "soft-reduction" and the cylinders of the first pinch roll 17 also do not intervene with the pressing action. Therefore, the first segment of the cast slab has a thickness equal to the thickness of the outlet section of the ingot mould 15 along the entire line up to the exit from the last rolling stand, and in this first step it is conventionally defined "non softed slab". The guide rollers of the curved roller conveyor 18 are idle.

An end of the curved roller conveyor 18 is hinged to allow the rotation and the release from the cast product when it is required to clear the path followed by the pre-strip in stationary running conditions and when, in emergency conditions, as for instance a cobble, it is necessary to discharge all of the material in the pit.

As mentioned above, at the end of the starting transient step, the casting takes place at a regular rate and the curved roller conveyor 18, also called "flap", is in an opening position allowing the pre-strip to form a free curve or loop 51 substantially having the shape of a circumference arc in the regular running conditions of the plant.

The presence of the free curve 51 introduces considerable advantages:

a) it allows to disengage the casting process from the rolling process further downstream and thus control possible differences in the rate between rolling and casting;

b) it allows to give greater flexibility to the plant allowing, for instance, the use of less sophisticated and less complicated apparatuses for the control of the process as the control of the drawing along the production line is not required;

c) it reduces the cooling of the pre-strip as there is no thermal exchange by conduction with the support and guide rollers of the conventional plants;

d) it avoids implications on the control of the level in the ingot mould with a great advantage on the castability and quality of the slab.

According to the present invention, the free curve is let floating within a predetermined range defined by the possible geometry which may be taken by the curve itself and by the features of the material; in this manner, the possibility of having controlled cumulations of material and therefore, always within the predefined limits, a complete decoupling between the rates upstream and downstream of the curve.

The control system constantly keeps the position of the free curve monitored, for instance by means of a probe, with respect to the predetermined upper and lower limits and intervenes when the curve itself approaches one of said limits by acting on the components of the plant according to predefined control processes.

Figure 3:
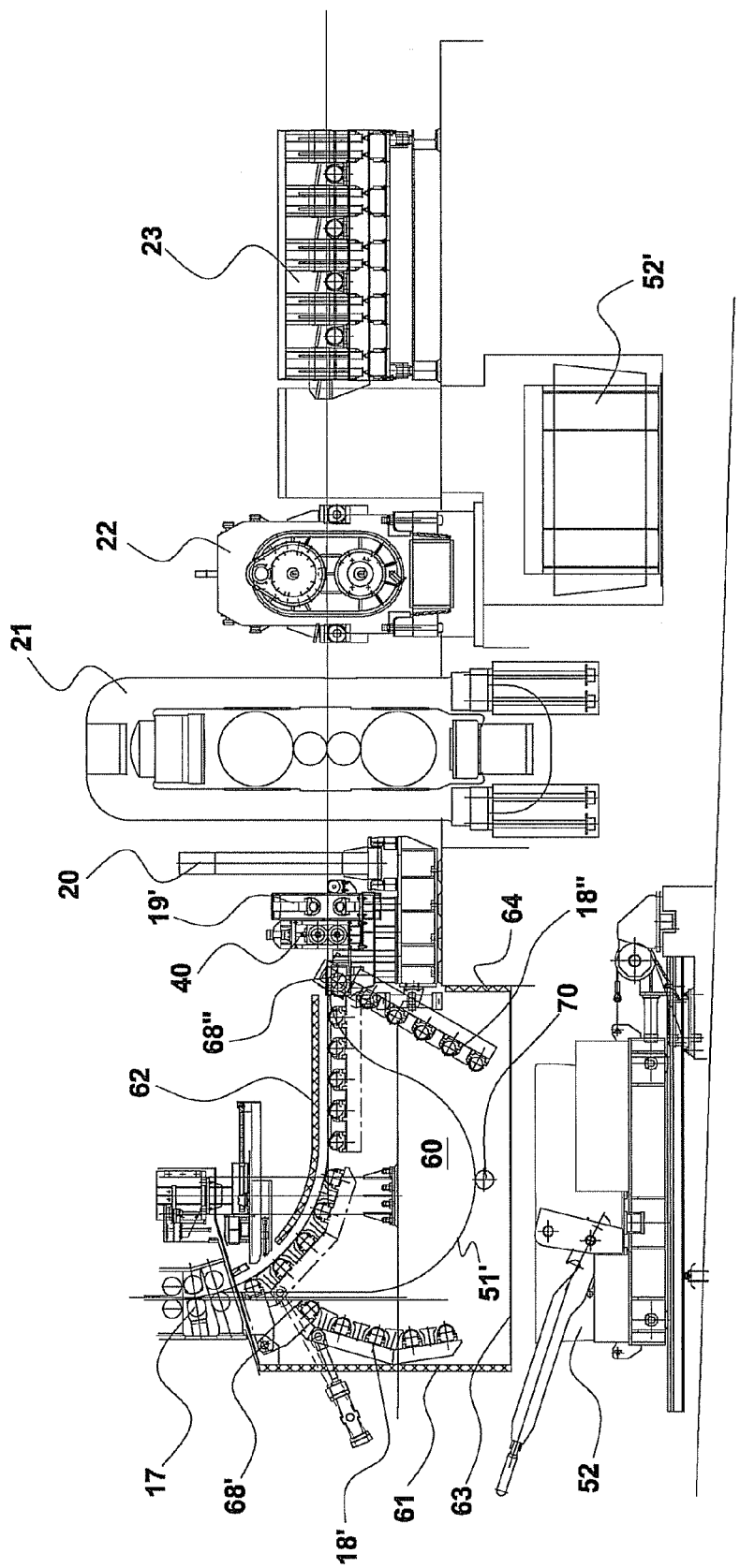
FIG. 3 represents a longitudinal section of an further embodiment of part of the plant in FIG. 1.

A further embodiment of part of the plant of the invention is illustrated in FIG. 3. The same elements already described are indicated with the same reference numbers of FIGS. 1 and 2.

In this advantageous embodiment, the curved roller conveyor or "flap" consists of two parts 18' and 18".

The first part 18' has a curved shape and is pivotably hinged about an end 68' thereof, the end 68' being placed in proximity of the lower end of the first pinch roll 17.

The second part 18" has a linear shape and is pivotably hinged about an end 68" thereof, the end 68" being placed in proximity of the two rollers of a second pinch roll 40.

Also with this embodiment of the deviation and guide device, at the end of the starting transient step, the casting takes place at a regular rate and the curved roller conveyor is in an opening position, reached by means of a rotation of the two parts 18', 18" about their respective ends 68', 68", allowing the pre-strip to form the free curve or loop 51' substantially having the shape of a circumference arc in the regular running conditions of the plant.

The free curve or loop 51' is greater than the free curve 51 obtainable by the deviation and guide device in its first embodiment (FIG. 2). Advantageously, it is provided at least one support roller 70 adapted to support the free curve of the pre-strip.

This greater free curve 51' always allows the continuity of the rolling process in the case of problems occurring in the casting machine, for example the sticking of the skin of the slab in the crystalliser. The free curve 51', acting as a buffer, allows to compensate the possible differences in rates between the casting machine and the rolling mill.

A further advantage is represented by the fact the two parts 18' and 18" of the curved roller conveyor are housed inside of a insulated chamber 60, defined by walls 61, 62, 63, 64 in the section of FIG. 3.

The wall 63, defining the bottom of the chamber 60, is openable or can be provided with an opening in order to allow falling of possible discards the to the collections case 52. Alternatively the wall 63 can not be provided.

This insulated chamber 60 provides the use of possible burners (not shown) for maintaining the pre-strip at an appropriate temperature before entering four high rolling stand 21.

At the beginning of the horizontal segment of the rolling line there is provided a descaler 19', for the removal of the scale from the surface of the cast product, which uses very high pressure and very low flow rate water. Said descaler 19', which includes upstream the second two roller pinch roll 40, is advantageously a high performance descaler, that is it allows to perform an accurate removal of the scale employing the minimum possible flow rate of water to reduce to a minimum the loss of heat from the cast product. Furthermore, the size of this descaler is very limited in depth.

The free curve 51 of the cast product starts at the lower end of the first pinch roll 17 and ends at the two rollers of said second pinch roll 40.

After the descaler 19' there are provided a control device 20 for controlling the temperature and the geometrical shape of the cast product and a four high rolling stand 21 adapted to carry out reductions in the thickness on said product.

Advantageously, the setting of the rolling parameters of the stand 21 is carried out as a function of the data detected by said device 20 in the sense that said rolling parameters are such as to create a profile of the strip suitable for the following rolling in the finishing mill placed further downstream, ensuring that a higher quality product is obtained. This stand 21 may carry out reductions in the thickness up to 40-50%, preferably around 35%.

Downstream of the stand 21 there is provided a rotating blade drum shear 22 adapted to carry out the following functions:

a) when the casting process starts, it separates the head of the dummy bar and it cuts long pieces of slab, which are not rolled, until the maximum casting rate is achieved and, therefore, until the plant reaches regular running conditions;

b) in case of malfunctioning on the casting line, it carries out a tail cutting of the slab so as to interrupt the continuity of the process and input good material to the rolling mill, and subsequently it carries out length cuttings until the shutdown of the plant;

c) in case of malfunctioning on the rolling mill 30, it interrupts the inflow of material to the same.

The drum shear in this position allows to obtain a better performance for the process as it allows to optimise the material discards in the starting and shutdown steps of the process and in the handling of emergencies.

In particular, in the case of the embodiment of FIG. 3, the drum shear 22 acts also as scrapping machine in emergency situations and there is provided a further collection case 52', under the drum shear 22, for collecting the possible scrap produced.

Downstream of the drum shear 22 there are advantageously provided heating systems 23 and/or temperature holding systems to ensure the correct temperature of the product inflowing in the first rolling stand of the finishing mill 30 in any running condition of the plant. Such heating systems 23 may be active, such as for instance induction heating ovens, or passive, such as for instance insulated hoods or insulating panels.

As the thermal losses of the product along the casting path are very limited, said heating systems 23 have a limited size, with a length in the range between 1 and 2 m. Advantageously, when exiting from one of said heating systems, the product must have a temperature—homogeneous throughout the entire section—of at least 1000° C., that is such as to ensure a temperature of at least 850° C. at the exit of the rolling mill 30.

In the case of an induction heating system, or simply an inductor, a power in the range between 3 and 5 MW at 3000 Hz is required to ensure such a temperature value. Using the inductor or not using it as well as the adjustment of the power employed are determined by the casting conditions, specifically by the casting rate and by the thickness after the "soft-reduction": such parameters define the so-called "mass flow" and the temperature of the product at the end of the casting line is correlated to said "mass flow". The inductor may advantageously be wheeled to be shut down laterally with respect to the production line. In this latter hypothesis, it allows a convenient access to the drum shear to carry out, for instance, the replacement of the blades.

Downstream of the heating systems 23 there are provided removal systems of the surface scale of the product, such as for instance a very high pressure and very low flow rate water descaler 19"; the descaler 19" advantageously includes a third two roller pinch roll 41 upstream and is wheeled for the lateral shutdown, thus allowing a more convenient maintenance of the same and a better accessibility to the first rolling stand.

The rolling finishing mill 30 consists of at least two rolling stands up to a maximum of six, and said strands are of the "four high" type. Each stand may perform thickness reductions up to 70%.

Downstream of the finishing mill 30 there are provided the following devices: a roller runway 31 provided with laminar water cooling showers 32, a flying shear 33 for the cutting to length and at least two spinning wheels 34, for instance of the "downcoiler" type.

Downstream of the spinning wheels an end area 50 is arranged for the deposit of the dummy bar and of the long pieces of slab cut by the drum shear 22.

The flying shear 33 is operated at a regular running condition to cut the strip to the length suitable to obtain a coil having a weight of about 30 tons.

In cooperation with the deviation and guide device 18 there are placed cutting means 24', 24" which preferably comprise two oxygen cutting blowpipes or torches each mounted on an arm having a substantially elongated shape, hinged at an end thereof and may take at least two working positions. Each blowpipe is placed respectively near the initial segment and the end segment of the deviation and guide device 18.

The way in which the oxygen cutting blowpipes operate is set forth hereafter.

If a cobble of the rolling mill should occur during the endless production process, the production line is cleared as follows:

the liquid steel feeding is interrupted upstream;

the casting line is cleared by moving forward, by the pinch roll 17, segments of slab which are then cut by the blowpipe 24';

the rolling line is cleared by leading the product blocked in the finishing mill to move back by means of the pinch rolls 40, 41, respectively included in the descalers 19', 19", and by cutting it in pieces by means of the blowpipe 24";

the pieces cut by the blowpipes are collected in the collection case 52 and are then cleared.

With the specific arrangement of the elements forming the plant, the development of the casting line, up to the end of the curved deviation and guide segment, results considerably lower with respect to the plants of the known art.

The reduced development of the casting line, between the crystalliser and the rolling stand 21 advantageously allows little scale to be formed on the cast product: this therefore allows to use lower power descalers, with less water and energy consumption, a lower cooling of the cast product and a lower vapour formation.

In virtue of the plant and process according to the present invention the finished product may be obtained in a very limited space and without discontinuity in the production line. Indeed, the casting by means of the crystalliser allows to cast a starting product, that is the slab itself, at a high rate and already having a thickness very near to that of the finished product, that is the strip.

Advantageously, the thin slabs which are obtained have a thickness exiting the crystalliser in the range between 40 and 55 mm, with a casting rate in the range between 4 and 16 m/min.

The invention allows the endless transformation of the liquid steel, coming from the steel plant, in coils of high quality thin steel strip at competitive prices in an extremely compact and highly flexible single cycle.

The overall length of the strip production plant according to the invention is in the range between 50 and 70 m, measured from the vertical casting axis Y, contained in the extrados vertical plane of the crystalliser, to the axis of the second spinning wheel.

The hot rolled strip obtained with the plant and the process of the invention has mechanical properties which are even better than those of similar products obtained by casting and hot rolling plants of the conventional type, thus, for different types of applications, the subsequent step of cold rolling employed by the conventional plants is no longer required. Accordingly, a considerable saving in terms of investment and production costs will result, as well as a considerable reduction of the energy requirement and a better environmental compatibility.

The invention claimed is:

1. A process for an endless production of hot rolled metal strip comprising an ingot mould including a crystalliser, a liquid core pre-rolling device, placed near an outlet section of the crystalliser, a first pinch roll, a deviation and guide device operable at least during predetermined periods of time, a first descaler including a second pinch roll, a first rolling stand, heating and/or temperature holding means, a second descaler including a third pinch roll, and a rolling finishing mill consisting of at least two second rolling stands, the process comprising the following steps without intermediate interruptions:

a) casting a thin slab exiting from the crystalliser at a rate comprised in a range between 4 and 16 m/min, having narrow sides with a size in a range between 40 and 55 mm, and a core in which steel is in a liquid state,
 b) carrying out a soft reduction operation of the slab by means of said liquid core pre-rolling device, so as to obtain a completely solidified cast product having a thickness in a range between 15 and 37 mm,
 c) forming a free curve on the cast product comprised in a portion between said first pinch roll and said second pinch roll,
 d) carrying out a first descaling operation on the cast product by means of said first descaler,
 e) carrying out a first rolling operation in the first rolling stand defining reductions up to 40-50% in the thickness of the completely solidified cast product;
 f) heating and/or temperature holding operation by means of said heating and/or temperature holding means,
 g) carrying out a second descaling operation on the cast product by means of said second descaler,
 h) carrying out a plurality of second rolling operations in said rolling finishing mill, for defining a strip having a thickness in the range between 0.8 and 12 mm.

2. A process according to claim 1, wherein before step e) there is provided detecting the temperature and the geometrical shape of the cast product by means of a control device and setting rolling parameters of said first rolling stand as a function of data detected by the control device.

3. A process according to claim 1, wherein the heating operation is carried out by means of an inductor to obtain a temperature of the strip exiting the rolling finishing mill not lower than 850° C.

4. A process according to claim 1, wherein the temperature holding operation is carried out by means of insulated hoods or insulating panels.

5. A process according to claim 1, wherein said soft reduction operation is dynamically controlled during transient steps of the process.

6. A process according to claim 1, wherein there is provided a third rolling operation on the cast product between the step b) and the step c) to obtain a pre-strip having a thickness in the range between 15 and 36 mm, by means of said first pinch roll.

7. A process according to claim 1, wherein said free curve substantially has a shape of a circumference arc in regular running conditions of the plant.

8. A process according to claim 1 or 7, wherein a position control operation for the free curve by means of a probe is provided during step c).

9. An endless production plant for hot rolled metal strip comprising an ingot mould including a crystalliser adapted to produce a liquid core thin slab having a thickness in the range between 40 and 55 mm, a liquid core pre-rolling device, placed near an outlet section of the crystalliser, a first pinch roll, a first descaler including a second pinch roll, a first rolling stand, heating and/or temperature holding means, a second descaler including a third pinch roll and a rolling finishing mill formed by at least two second rolling stands, wherein between the first pinch roll and the second pinch roll there is provided a deviation and guide device, operable at least during predetermined periods of time, for deviating and guiding the cast product from a vertical path to a horizontal path, adapted to release the product cast at a regular running condition so as to allow the formation of a free curve of the cast product in a portion between said first pinch roll and said second pinch rolls.

10. A plant according to claim 9, wherein the deviation and guide device comprises a single curved roller conveyor pivotably hinged about an end thereof.

11. A plant according to claim 9, wherein the deviation and guide device comprises a roller conveyor provided with a first part, having a curved shape and pivotably hinged about an end thereof in proximity of the lower end of the first pinch roll, and a second part, having a linear shape pivotably hinged about an end thereof in proximity of the second pinch roll.

12. A plant according to claim 11, wherein said first part and second part are housed inside a insulated chamber provided with burners.

13. A plant according to claim 9, wherein there is provided a control device for controlling temperature and geometric shape of the cast product, arranged between the first descaler and the first rolling stand.

14. A plant according to claim 9, wherein the liquid core pre-rolling device is substantially vertical and comprises a group of transversal intrados and extrados rollers profiled so as to modify the transit section of the slab and carry out a progressive flattening action of the surface of the slab, so as to obtain a cast product having a rectangular section.

15. A plant according to claim 9, wherein there are provided cutting means for cutting the slab, for emergency situations, placed near the free curve.

* * * * *

UNITED STATES PATENT AND TRADEMARK OFFICE
CERTIFICATE OF CORRECTION

PATENT NO. : 7,954,539 B2
APPLICATION NO. : 12/450290
DATED : June 7, 2011
INVENTOR(S) : Gianpietro Benedetti et al.

Page 1 of 1

It is certified that error appears in the above-identified patent and that said Letters Patent is hereby corrected as shown below:

Title Page Item (73) should read:

(73) Assignee: Danieli & C. Officine Meccaniche, S.p.A., Buttrio (IT)

Signed and Sealed this
Sixteenth Day of August, 2011

David J. Kappos
*Director of the United States Patent and Trademark Office*